United States Patent
Sundarrajan et al.

(10) Patent No.: US 12,387,282 B2
(45) Date of Patent: Aug. 12, 2025

(54) SYSTEM AND METHOD FOR MANAGEMENT OF LIFE CYCLE OF CONTRACTS

(71) Applicant: Tata Consultancy Services Limited, Mumbai (IN)

(72) Inventors: Vasundhara Sundarrajan, Chennai (IN); Vennimalai Rabindran, Chennai (IN); Sitarama Brahmam Gunturi, Hyderabad (IN); Senthil Kumar Ramasamy, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 533 days.

(21) Appl. No.: 17/817,587

(22) Filed: Aug. 4, 2022

(65) Prior Publication Data
US 2023/0229866 A1    Jul. 20, 2023

(30) Foreign Application Priority Data
Dec. 30, 2021    (IN) .............................. 202121061656

(51) Int. Cl.
G06Q 30/00    (2023.01)
G06Q 50/18    (2012.01)

(52) U.S. Cl.
CPC .................................. G06Q 50/18 (2013.01)

(58) Field of Classification Search
CPC ........................... G06Q 50/18; G06Q 10/0635
See application file for complete search history.

(56) References Cited

U.S. PATENT DOCUMENTS

| | | | | |
|---|---|---|---|---|
| 7,853,498 B2 * | 12/2010 | Finley | ................... | G06Q 40/02 705/35 |
| 9,514,499 B1 * | 12/2016 | Kogut-O'Connell | ........................ | G06Q 10/10 |

(Continued)

FOREIGN PATENT DOCUMENTS

| | | | | |
|---|---|---|---|---|
| AU | 2020200800 A1 | 2/2020 | | |
| EP | 4207014 A1 * | 7/2023 | ........... | G06F 40/186 |

OTHER PUBLICATIONS

Blycha, Natasha and Garside, Ariana. "Smart Legal Contracts: A Model for the Integration of Machine Capabilities into Contracts." UCLA School of Law, SSRNE Journals, Jan. 27, 2021. (Year: 2021).*

(Continued)

*Primary Examiner* — Luis A Brown
(74) *Attorney, Agent, or Firm* — Finnegan, Henderson, Farabow, Garrett & Dunner, LLP

(57) ABSTRACT

Contracts are a fundamental tool for coordinating economic activity and need to be managed throughout the lifecycle of contracts. The existing methods are incomplete, expensive, time-consuming, and error-prone. A method and system for management of lifecycle of contracts have been provided. The system leverages a combination of artificial intelligence (AI) techniques appropriate for different micro services in contract lifecycle management. The deep learning and natural language processing (NLP) techniques help in understanding of clauses of the contract, risk levels involved in the contract. The system is configured to automatically generate contracts for a customer based on the other criteria of the customer. The system also identifies alternate options to risky clauses and mandatory clauses to be included. The system is also configured to manage the workflows based on context of contract to seek exception approvals from appro- (Continued)

priate stakeholders during contract creation and alert appropriate stakeholders on delivery governance issues.

13 Claims, 7 Drawing Sheets

(56) References Cited

U.S. PATENT DOCUMENTS

| | | | | |
|---|---|---|---|---|
| 9,747,562 | B1* | 8/2017 | Krappe | G06Q 10/06 |
| 9,754,206 | B1* | 9/2017 | Brestoff | G06Q 10/10 |
| 9,940,681 | B2* | 4/2018 | Kogut-O'Connell | |
| | | | | G06Q 50/18 |
| 2002/0129056 | A1* | 9/2002 | Conant | G06Q 30/06 |
| | | | | 715/255 |
| 2004/0019578 | A1* | 1/2004 | Kalmes | G06F 16/90344 |
| 2004/0230453 | A1* | 11/2004 | Belmore | G06Q 10/06395 |
| | | | | 705/317 |
| 2005/0182736 | A1* | 8/2005 | Castellanos | G06F 40/211 |
| | | | | 705/80 |
| 2006/0287966 | A1* | 12/2006 | Srinivasaraghavan | |
| | | | | G06Q 10/10 |
| | | | | 705/1.1 |
| 2008/0306784 | A1* | 12/2008 | Rajkumar | G06Q 50/18 |
| | | | | 705/342 |
| 2014/0053069 | A1* | 2/2014 | Yan | G06Q 10/0635 |
| | | | | 715/259 |
| 2014/0108072 | A1* | 4/2014 | McGowan | G06Q 10/06312 |
| | | | | 705/7.11 |
| 2015/0121211 | A1* | 4/2015 | Fernandes | G06F 40/258 |
| | | | | 715/269 |
| 2017/0011313 | A1* | 1/2017 | Pochert | G06F 3/0481 |
| 2017/0262751 | A1* | 9/2017 | Reddy | G06Q 10/00 |
| 2017/0287090 | A1* | 10/2017 | Hunn | H04L 63/12 |
| 2017/0364374 | A1* | 12/2017 | Maiden | G06F 9/453 |
| 2018/0005186 | A1* | 1/2018 | Hunn | G06F 16/219 |
| 2018/0268506 | A1* | 9/2018 | Wodetzki | G06F 15/76 |
| 2018/0315141 | A1* | 11/2018 | Hunn | G06F 9/547 |
| 2020/0104957 | A1* | 4/2020 | Guo | G06F 40/30 |
| 2020/0226510 | A1* | 7/2020 | Gupta | G06Q 50/18 |
| 2020/0327151 | A1* | 10/2020 | Coquard | G06F 16/3347 |
| 2020/0327172 | A1* | 10/2020 | Coquard | G06F 16/9035 |
| 2021/0035247 | A1* | 2/2021 | Swanson | G06F 3/0482 |
| 2021/0201013 | A1* | 7/2021 | Makhija | G06V 30/414 |
| 2022/0092711 | A1* | 3/2022 | Venkatesan | G06Q 50/18 |
| 2022/0335553 | A1* | 10/2022 | Chew | G06F 16/35 |
| 2023/0229866 | A1* | 7/2023 | Sundarrajan | G06Q 10/0635 |
| | | | | 704/9 |

OTHER PUBLICATIONS

Von Janmehsadat Mousavinezhad, etal. "Knowledge Extraction Methods for the Analysis of Contractual Agreements." University of Bonn, Germany, May 31, 2021. (Year: 2021).*

Hassan, Fahad, et al. "Addressing Legal and Contractual Matters in Construction Using Natural Language Processing: A Critical Review." Journal of Construction Engineering and Management, vol. 147, No. 9, Dec. 7, 2021. (Year: 2021).*

Lippi, Marco et al., "Claudette: an Automated Detector of Potentially Unfair Clauses in Online Terms of Service", Artificial Intelligence—Computers and Society, Date: 2020, Publisher: Arxiv, https://arxiv.org/pdf/1805.01217.pdf.

* cited by examiner

SYSTEM AND METHOD FOR MANAGEMENT OF LIFE CYCLE OF CONTRACTS

PRIORITY CLAIM

This U.S. patent application claims priority under 35 U.S.C. § 119 to: Indian Patent Application No. 202121061656, filed on 30 Dec. 2021. The entire contents of the aforementioned application are incorporated herein by reference.

TECHNICAL FIELD

The disclosure herein generally relates to the field of contract lifecycle management and more particularly, an automated method and system for management of lifecycle of contracts using a combination of artificial intelligence (AI) techniques.

BACKGROUND

A contract is a legally enforceable agreement to exchange value such as goods, services, or property. Contracts are a fundamental tool for coordinating economic activity. When parties engage in a transaction, oftentimes a contract is created and executed that delineates the terms of the transaction that the parties' legal and business representatives have negotiated and ultimately agreed upon. The intention in signing a contract is that all parties will perform as expected.

Modern business organizations have dozens, hundreds or even thousands of contracts that need to be monitored, approved, reviewed and executed. Contracts can be voluminous and may comprise a lot of pages consisting of wide variety of clauses highlighting rights, obligations, relationships, restrictions, and deadlines. Further, contracts dealing with delivery of information technology (IT) information services (IS), business process outsourcing (BPO) and related services lack any form of standardization or a set process due to the sheer number of customers and vendors involved in the process. Further multinational organizations include a plurality of stakeholders during the lifecycle of the contracts, such as a requestor, managers, finance team, legal team, senior management etc., which further increases the complexity of managing the contracts in an optimal way. Due to the involvement of complexity of services being provided, volume of contracts generated, wide range of contract value, duration, geographical spread and continuous evolution of business models, it is challenging to achieve a) standardization and b) an effective and easy mechanism of ensuring that the right set of terms are agreed to at the beginning of the contracting process so as to enable a smooth and risk managed execution. This makes it difficult to ensure appropriate level of transparency to commitments, and governance is limited to key aspects of critical contracts. While the contracts intend to distribute risks amongst the parties, a quantitative measurement of risk involved intrinsically due to the agreed terms and calculating an effective returns of the contracts after factoring in the risks involved is next to impossible for any of the parties involved.

SUMMARY

Embodiments of the present disclosure present technological improvements as solutions to one or more of the above-mentioned technical problems recognized by the inventors in conventional systems. For example, in one embodiment, a system for management of lifecycle of contracts is provided. The system comprises an input/output interface, one or more hardware processors and a memory. The input/output interface receives a request by a user for a creation or an amendment of a contract, wherein the request comprises a plurality of metadata corresponding to the contract. The memory is in communication with the one or more hardware processors, wherein the one or more first hardware processors are configured to execute programmed instructions stored in the one or more first memories, to: route the received request to an authoring unit for choosing a template to be used for the contract, wherein the template is picked from a contract guide based on a set of required combinations using a classification technique, or the template is generated using a natural language processing technique, if no template exists in the contract guide for the set of required combinations; digitize the chosen template to identify a plurality of meta-clauses of the contract using a natural language processing technique; classify a plurality of attributes of each of the plurality of meta-clauses; evaluate risks associated with the plurality of meta-clauses in the contract; update the chosen template with the plurality of metadata to generate a draft contract using a deep writing technique; send the draft contract along with the evaluated risk for a legal review, wherein the legal review results in one of the following: approval of the draft contract, wherein the approval also comprises a set of risky clauses identified in the draft contract, or updating one or more clauses of the draft contract either from the contract guide or manually, wherein the updated contract is sent back for digitization and risk evaluation; send the draft contract to the user, if the draft contract is approved in the legal review, wherein the user takes one of the following actions: send the draft contract to a plurality of stakeholders, wherein the plurality of stakeholders is decided based on the set of risky clauses present in the draft contract, and after the stakeholders' approvals amend the draft contract based on the set of risky clauses identified during the legal review; execute signatures of contracting parties on the draft contract to finalize the contract; and track the fulfilment of contractual commitments with the contracting parties, whether obligations have been fulfilled using a fuzzy logic.

In another aspect, a method for management of lifecycle of contracts is provided. Initially, a request is received by a user for a creation or an amendment of a contract, wherein the request comprises a plurality of metadata corresponding to the contract. Further, the received request is routed to an authoring unit for choosing a template to be used for the contract, wherein the template is picked from a contract guide based on a set of required combinations using a classification technique, or the template is generated using a natural language processing technique, if no template exists in the contract guide for the set of required combinations. In the next step, the chosen template is digitized to identify a plurality of meta-clauses of the contract using a natural language processing technique. A plurality of attributes is then classified of each of the plurality of meta-clauses. In the next step, risks associated with the plurality of meta-clauses in the contract is evaluated. In the next step, the chosen template is updated with the plurality of metadata to generate a draft contract using a deep writing technique. The draft contract along with the evaluated risk is then sent for a legal review, wherein the legal review results in one of the following: approval of the draft contract, wherein the approval also comprises a set of risky clauses identified in the draft contract, or updating one or more clauses of the draft contract either from the contract guide or manually, wherein the updated contract is sent back for digitization and risk evaluation. In the next step, the draft contract is sent to the user, if the draft contract is approved in the legal review, wherein the user takes one of the following actions: send the draft contract to a plurality of stakeholders, wherein the plurality of stakeholders is decided based on the set of risky clauses present in the draft contract, and amend the draft contract based on the set of risky clauses identified during the legal review. Further, signatures of contracting parties are executed on the draft contract to finalize the contract. And finally, the fulfilment of contractual commitments with the contracting parties is tracked, whether obligations have been fulfilled using a fuzzy logic.

In yet another aspect, one or more non-transitory machine-readable information storage mediums comprising one or more instructions which when executed by one or more hardware processors cause management of lifecycle of contracts. Initially, a request is received by a user for a creation or an amendment of a contract, wherein the request comprises a plurality of metadata corresponding to the contract. Further, the received request is routed to an authoring unit for choosing a template to be used for the contract, wherein the template is picked from a contract guide based on a set of required combinations using a classification technique, or the template is generated using a natural language processing technique, if no template exists in the contract guide for the set of required combinations. In the next step, the chosen template is digitized to identify a plurality of meta-clauses of the contract using a natural language processing technique. A plurality of attributes is then classified of each of the plurality of meta-clauses. In the next step, risks associated with the plurality of meta-clauses in the contract is evaluated. In the next step, the chosen template is updated with the plurality of metadata to generate a draft contract using a deep writing technique. The draft contract along with the evaluated risk is then sent for a legal review, wherein the legal review results in one of the following: approval of the draft contract, wherein the approval also comprises a set of risky clauses identified in the draft contract, or updating one or more clauses of the draft contract either from the contract guide or manually, wherein the updated contract is sent back for digitization and risk evaluation. In the next step, the draft contract is sent to the user, if the draft contract is approved in the legal review, wherein the user takes one of the following actions: send the draft contract to a plurality of stakeholders, wherein the plurality of stakeholders is decided based on the set of risky clauses present in the draft contract, and amend the draft contract based on the set of risky clauses identified during the legal review. Further, signatures of contracting parties are executed on the draft contract to finalize the contract. And finally, the fulfilment of contractual commitments with the contracting parties is tracked, whether obligations have been fulfilled using a fuzzy logic.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Contracts are a fundamental tool for coordinating economic activity. Modern business organizations have dozens, hundreds or even thousands of contracts that need to be monitored, approved, reviewed and performed. Contracts can be voluminous and may comprise a lot of pages of rights, obligations, relationships, restrictions, and deadlines. Further, contracts dealing with delivery of information technology (IT) information services (IS), business process outsourcing (BPO) and related services lack any form of standardization due to the sheer number of customers and vendors involved in the process. This makes it difficult to ensure appropriate level of transparency to commitments, and governance is limited to key aspects of critical contracts.

Figure 1:
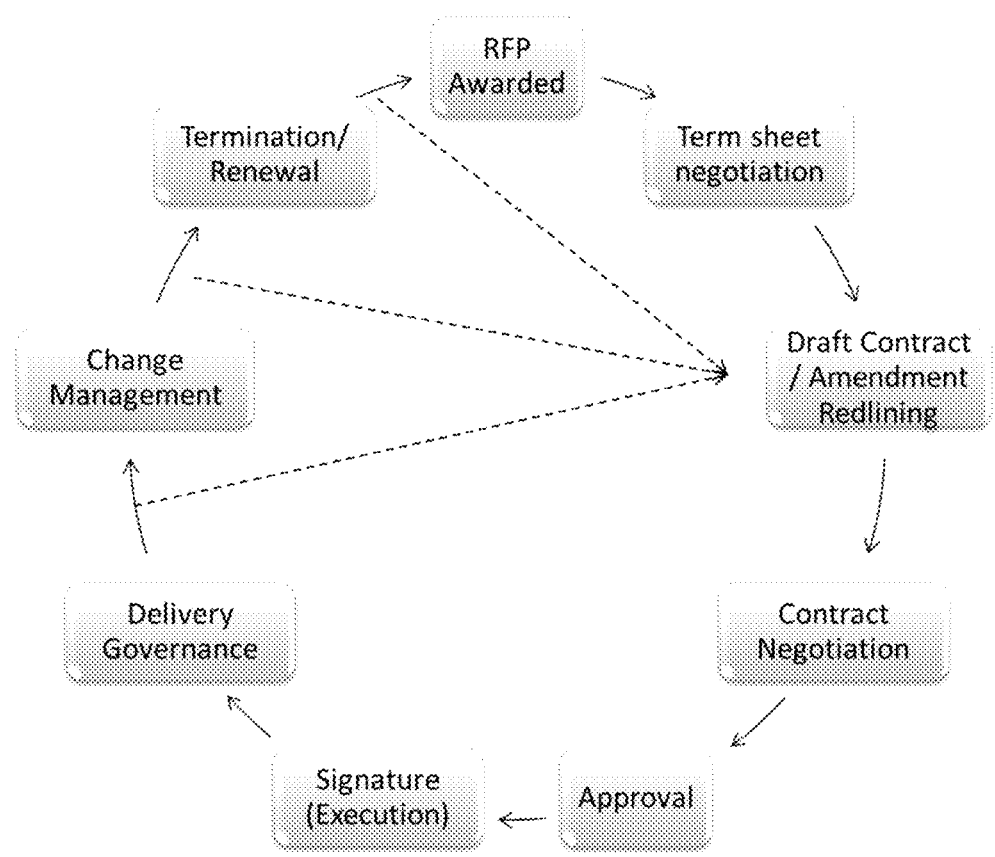
FIG. 1 is a schematic diagram showing lifecycle of a contract.

FIG. 1 shows the basic lifecycle of a contract. The lifecycle of the contract starts with a request for proposal (RFP). Based on the RFP, term sheet is negotiated between the contracting parties. Then, based on the negotiation a draft contract is prepared. This prepared draft contract then further negotiated by the contracting parties. The draft contract is then sent for the approval of legal team and various other stakeholders. Once the approval is done, the draft contract is executed by taking signatures of the contracting parties. Further, delivery of the output of the contract is governed. And finally, after the change management either the contract is terminated or renewed.

In the existing methods of prior art, contract evaluation has only been accomplished by extracting the data manually by human experts, which is an expensive, time-consuming, and error-prone task that would only yield a portion of the necessary data. Few commercial automated solutions also exist for the initial legal related aspects of Contract lifecycle management. However, there are many critical aspects in contract lifecycle management that still do not have an efficient solution integrated with the complete lifecycle. There is a definite gap in meeting the needs of "Sellers" as existing products are tailored for "Buyers".

Prior arts in the broad space of contract management utilize forward engineering to build contracts by selecting appropriate clauses from a standard library or allowing experts to directly input clauses. Those solutions that work on signed contracts and reverse engineer to the components remain at a meta data stage capturing only key attributes like dates, amounts, parties etc. Therefore, there is a need in the art for a system that uses machine evaluation of contract documents to quickly and inexpensively present contract portfolio data in an accurate, organized, searchable and time-organized manner.

The embodiments herein provide an automated method and a system for management of lifecycle of contracts. The disclosure provides a holistic solution that leverages a combination of artificial intelligence (AI) techniques appropriate for different micro services in contract lifecycle management. The system is configured to automatically generate contracts for a customer based on the service, geography and other criteria specific to the customer. Further, the system also identifies smallest logical units of clauses and attendant attributes like P&L impact, risk exposure, probability etc. The system also identifies alternate options to risky clauses and mandatory clauses to be included. The system is also configured to manage the workflows based on context of contract to seek exception approvals from appropriate stakeholders during contract creation and alert appropriate stakeholders on delivery governance issues. The risk exposure is also evaluated dynamically at clause level and probability of risk materializing.

Referring now to the drawings, and more particularly to FIG. 2 through FIG. 7, where similar reference characters denote corresponding features consistently throughout the figures, there are shown preferred embodiments and these embodiments are described in the context of the following exemplary system and/or method.

Figure 2:
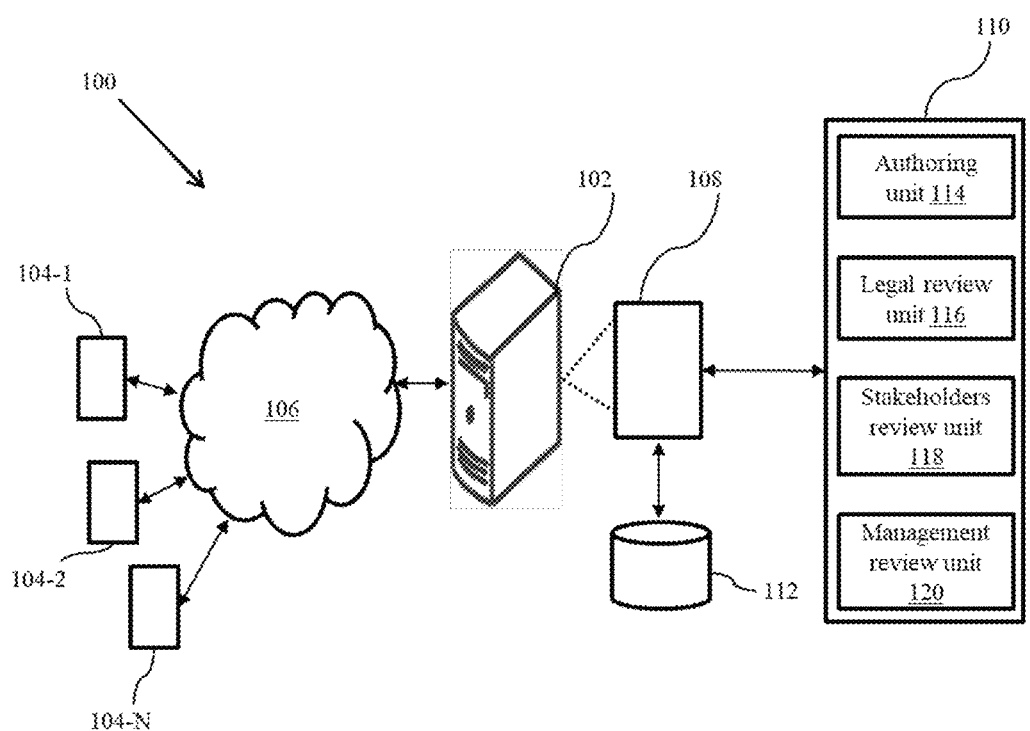
FIG. 2 illustrates a network diagram of a system for management of lifecycle of contracts according to some embodiments of the present disclosure.

FIG. 2 illustrates a block diagram of a system 100 for managing the life cycle of a contract. The system 100 is configured to use deep learning and natural language processing (NLP) techniques to analyze existing contracts and their actual execution data. This helps in understanding of clauses of the contract, risk levels involved in the contract, probabilities and templates. The system 100 is also configured to use deep writing and fuzzy logic to utilize the knowledge gained for creation of new contracts and providing guidance on alternates, risks etc. The system 100 is also using NLP to monitor and govern delivery execution and data to ensure smart updates and action triggers to appropriate stakeholders.

Although the present disclosure is explained considering that the system 100 is implemented on a server, it may also be present elsewhere such as a local machine. It may be understood that the system 100 comprises one or more computing devices 102, such as a laptop computer, a desktop computer, a smartphone, a notebook, a workstation, a cloud-based computing environment and the like. It will be understood that the system 100 may be accessed through one or more input/output interfaces 104-1, 104-2 . . . 104-N, collectively referred to as I/O interface 104. Examples of the I/O interface 104 may include, but are not limited to, a user interface, a portable computer, a personal digital assistant, a handheld device, a smartphone, a tablet computer, a workstation and the like. The I/O interface 104 are communicatively coupled to the system 100 through a network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

The system 100 may be implemented in a workstation, a mainframe computer, a server, and a network server. In an embodiment, the computing device 102 further comprises one or more hardware processors 108, one or more memory 110, hereinafter referred as a memory 110 and a data repository 112, for example, a repository 112. The memory 110 is in communication with the one or more hardware processors 108, wherein the one or more hardware processors 108 are configured to execute programmed instructions stored in the memory 110, to perform various functions as explained in the later part of the disclosure. The repository 112 may store data processed, received, and generated by the system 100.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

According to an embodiment of the disclosure, the memory 110 further comprises a plurality of units. The plurality of units is configured to perform various functions. The plurality of units comprises an authoring unit 114, a legal review unit 116, a stakeholders review unit 118 and a management review unit 120.

According to an embodiment of the disclosure, the input/output interface 104 is configured to receive, a request by a user for a creation or amendment of the contract, wherein the request comprises a plurality of metadata corresponding to the contract. The plurality of metadata comprises names of contracting parties, a start date of the contract, an end date of the contract, a value and scope of the contract. The plurality of metadata may also comprise any other data related to the contract. In an organization, there are multiple users and a plurality of stakeholders which are involved in the contract generation and contract management process. The user and the plurality of stakeholders comprise a legal team, senior management in the organization, sales managers, delivery managers, finance team, human resources team or any other team providing support functions in the organization.

The request for the creation or amendment of the contract is generated via the one or more hardware processors or via the one or more channels. For the sake of clarity in the present disclosure, the use of phrases "the one or more channels" and "the one or more hardware processors" is interchangeable. The one or more channels may be, but not limited to, a website, or an application running on the mobile phone.

Figure 3:
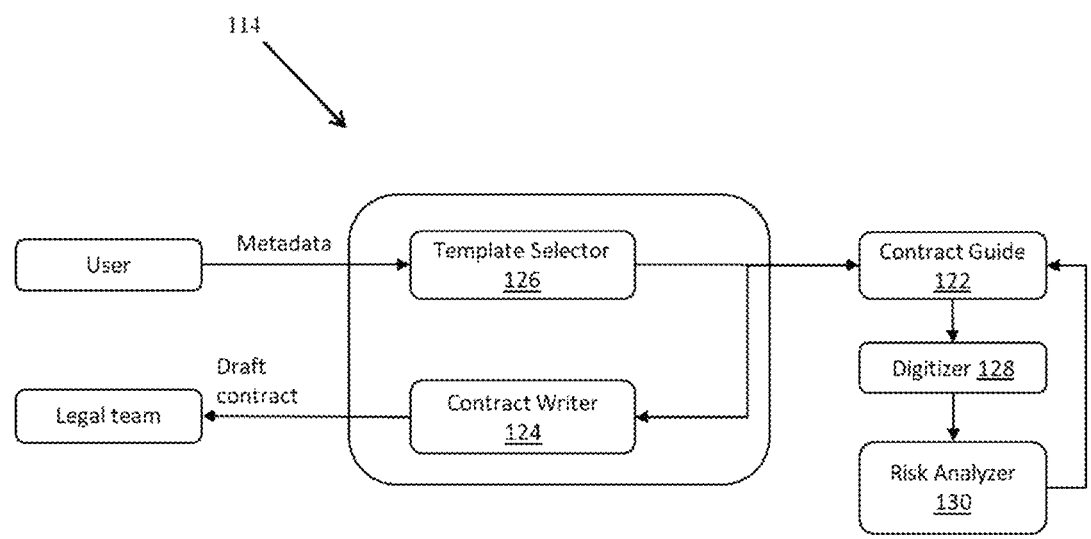
FIG. 3 is showing schematic representation of the working of an authoring unit according to some embodiments of the present disclosure.

According to an embodiment of the disclosure, the system 100 comprises the authoring unit 114 as shown in the schematic diagram of FIG. 3. The authoring unit 114 is configured to receive the request and choose a template which can be used for the contract. The template is picked from a contract guide 122 based on a set of required combinations using a classification technique. The contract guide 122 is a type of pre-made repository containing a plurality of contract templates. The contract guide 122 uses deep learning technique to create a plurality of templates for a plurality of scenarios. Though if no template exists in the contract guide 122 for the set of required combinations, then the template is generated using a natural language processing (NLP) technique via a contract writer 124. The template is picked using a fuzzy logic technique by a template selector 126.

According to an embodiment of the disclosure, the authoring unit 114 also configured to digitize the chosen template to identify a plurality of meta-clauses of the contract using a natural language processing technique via a digitizer 128. The authoring unit 114 also configured to classify a plurality of attributes for each of the plurality of meta-clauses. The authoring unit 114 further configured to evaluate risks associated with the plurality of meta-clauses in the contract via a risk analyzer 130. Once the risks are evaluated, the chosen template is then updated with the plurality of metadata to generate a draft contract using a deep writing technique. The risk analyzer 130 calculates a probability of risks and benefits materializing for each of the plurality of meta-clauses based on historic data from the contract guide 122.

Figure 4:
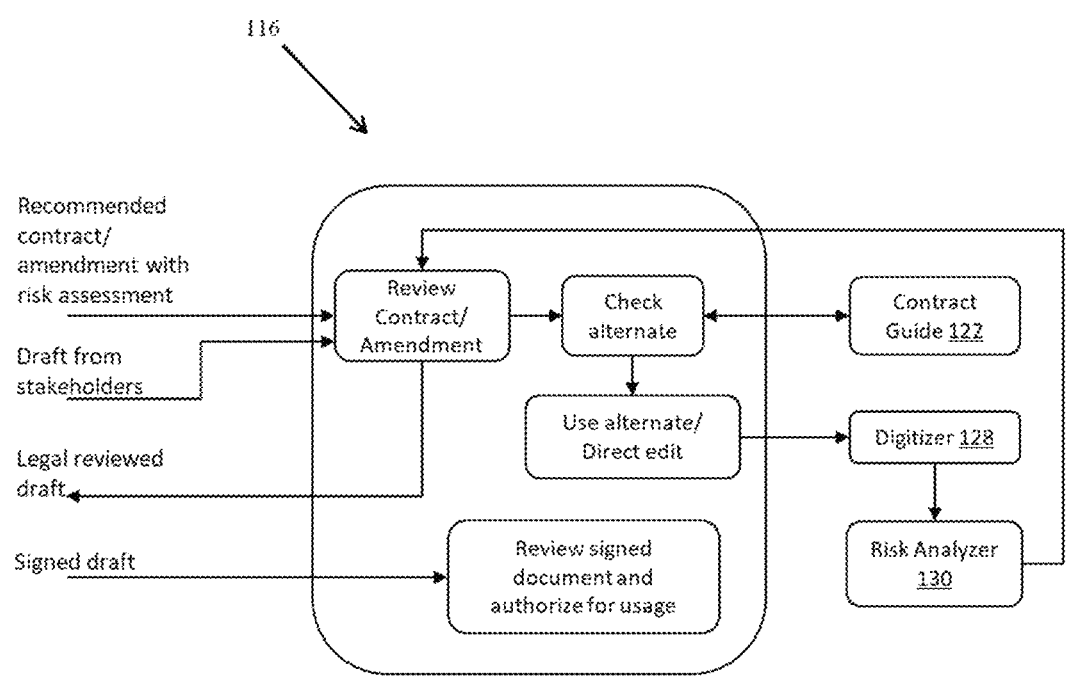
FIG. 4 is showing schematic representation of the working of a legal review unit according to some embodiments of the present disclosure.

The authoring unit 114 is further configured to send the draft contract along with the evaluated risk for a legal review to the legal review unit 116. FIG. 4 is a schematic representation of the legal review unit 116. The legal team reviews the appropriateness of template, metadata usage in the draft contract, variance from standard, risk scores. After the legal review, if it is found that the draft contract is prepared as per a defined set of guidelines then the draft contract is approved. The approval also results in identification of a set of risky clauses in the draft contract for future assessment. If the draft contract is not prepared as per the defined set of guidelines, then the draft contract is not approved and the legal review unit 116 checks for the alternate clauses in the contract guide 122 or edit the draft contract manually. The legal review unit 116 is then configured to update the one or more clauses of the draft contract either from the contract guide or manually. The updated draft contract is then sent back by the legal review unit 116 to the authoring unit 114 for digitization and risk evaluation. Once the updated draft is approved, the legal review unit 114 is configured to send the draft contract to the user.

Figure 5:
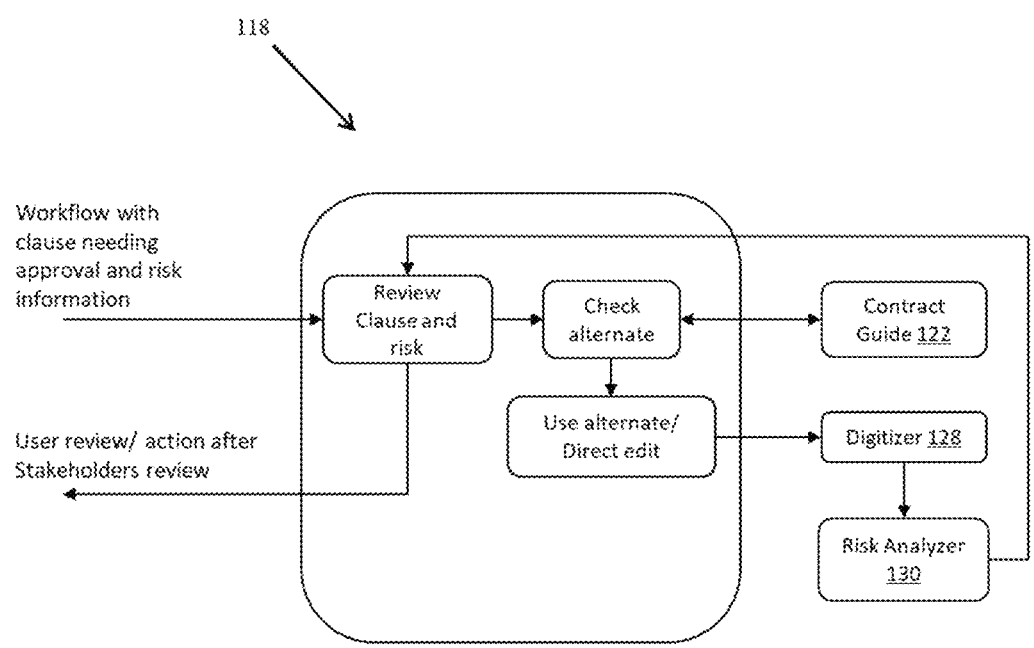
FIG. 5 is showing schematic representation of the working of a stakeholders review unit according to some embodiments of the present disclosure.

According to an embodiment of the disclosure, the system 100 further comprises the stakeholders review unit 118 and the management review unit 120. FIG. 5 is a schematic representation of the stakeholders review unit 118. The authoring unit 114 is further configured to send the legal approved document to the plurality of stakeholders along with the indication of risk levels and exception approvals required. The plurality of stakeholders to which the draft contract needs to be sent is decided based on the set of risky clauses present in the draft contract. The plurality of stakeholders can request for exception approval or amend the contract to not have exceptions.

The plurality of stakeholders is configured to review the legal approved draft contract. The plurality of stakeholders normally reviews the exception clauses with risk information. The stakeholders review unit 118 checks for the alternate clauses in the contract guide 122. The stakeholders review unit 118 is then configured to update the one or more clauses of the draft contract from the contract guide 122. The updated draft contract is then sent back by the stakeholders review unit 118 to the authoring unit 114 for digitization and risk evaluation. Once the updated draft is approved, the stakeholders review unit 118 is configured to send the draft contract to the user.

In another embodiment of the disclosure, a request may be triggered to the legal team to directly accept exception approval or amend document to remove exception. The contract guide 122 uses a rules engine to determine a number of approvals required for exceptions in agreed standards for clauses.

Figure 6:
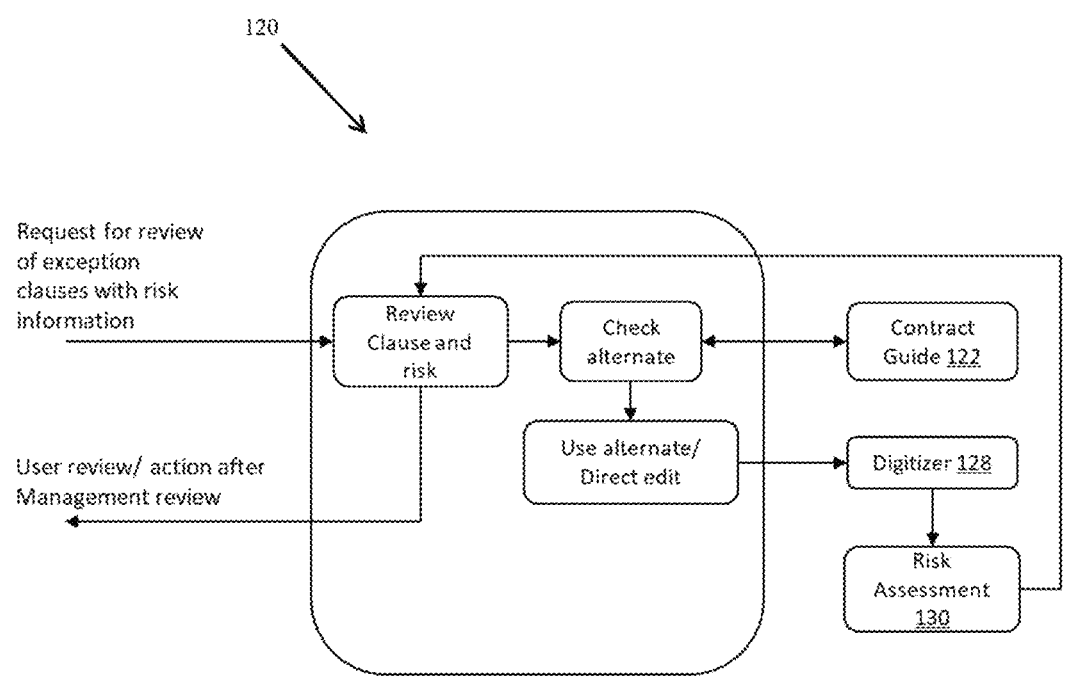
FIG. 6 is showing schematic representation of the working of a management review unit according to some embodiments of the present disclosure.
Figure 7:
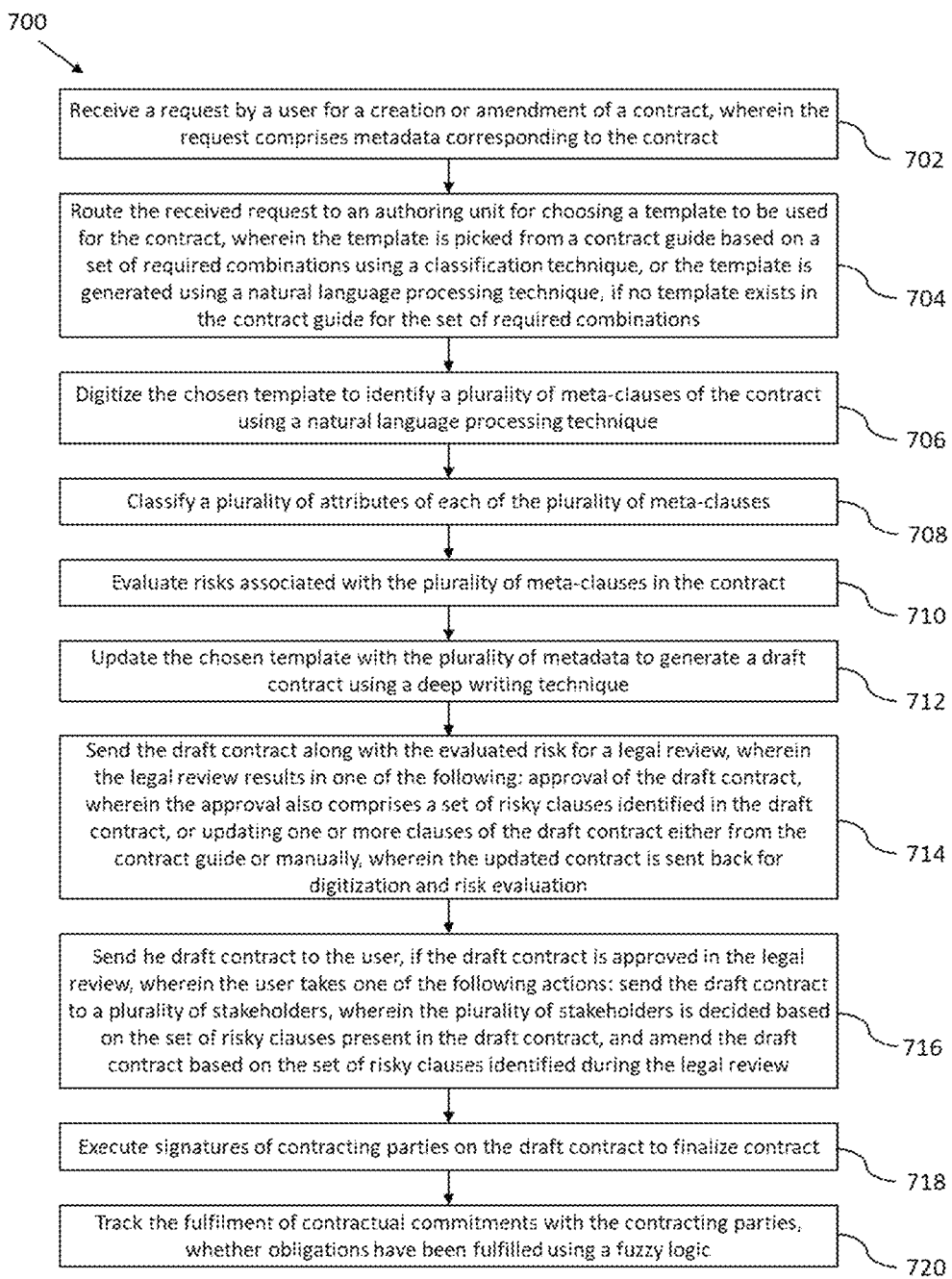
FIG. 7 is a flow diagram illustrating a method for management of lifecycle of contracts in accordance with some embodiments of the present disclosure.

According to an embodiment of the disclosure, the management review unit 120 is configured to review the legal approved and the stakeholders reviewed draft contract. FIG. 6 is a schematic representation of the management review unit 120. The authoring unit 114 sends legal approved document to the user with indication of risk levels and exception approvals required from senior management such as CEO, CFO etc. The senior management can request for exception approval or amend the contract to not have exceptions. The management review unit 120 checks for the alternate clauses in the contract guide 122. The management review unit 120 is then configured to update the one or more clauses of the draft contract from the contract guide 122. The updated draft contract is then sent back by the management review unit 120 to the authoring unit 114 for digitization and risk evaluation. Once the updated draft is approved, the management review unit 120 is configured to send the draft contract to the user.

According to an embodiment of the disclosure, the legal review unit 116 is further configured to send the draft contract to appropriate authorized signatory to be signed to finalize the contract. The contract can be signed physically or digitally. The user confirms the removal or approval of the exception clauses from the draft contract. The system 100 further configured to determine appropriate signatory and appropriate signature process using a rule engine. The signed contract is then finally sent to the legal review unit 116 for check whether all the signatures are present as per a preset compliance.

According to an embodiment of the disclosure, the system 100 is also configured to initiate the workflow for renewing the contract. Initially, the end date, a project type of the contract is checked. An appropriate timeframe is then defined to initiate renewal for each customer using a rule engine. A workflow is then initiated to the user for approval based on decision made by the rule engine. And finally, a workflow is initiated to the authoring unit 114 for amendment of the contract if the user approves the request.

According to an embodiment of the disclosure, the system 100 is also configured to initiate the workflow for amending the contract. Initially, data related to the contract is analyzed using NLP to determine if the contract amendment process needs to be triggered. A request is then initiated to the user based on the analysis. In the last step, the workflow is initiated to the authoring unit 114 for creation of amendment, if the user approves the request.

According to an embodiment of the disclosure, the system 100 is also configured to initiate the workflow for terminating the contract. Initially, data related to the contract is analyzed using the natural language processing technique to determine if termination process needs to be triggered as per a set of termination clauses present in the contract. A workflow is then initiated to get approval from the user based on the analysis. Further, workflow is initiated to the authoring unit 114, if the user approves the termination. And finally, workflows are initiated to the relevant stakeholders to raise invoices related to the termination.

According to an embodiment of the disclosure, the system 100 is also configured to track, the fulfilment of contractual commitments with the contracting parties, whether obligations have been fulfilled or not, using a fuzzy logic technique.

According to an embodiment of the disclosure, the system 100 is also configured to perform analytics and report the final contract on the I/O interface 104 based on the request from the plurality of stakeholders as per their role. The final contract is stored in the data repository 112.

FIG. 3 illustrates an example flow chart of a method 300 for management of lifecycle of contracts, in accordance with an example embodiment of the present disclosure. The method 300 depicted in the flow chart may be executed by a system, for example, the system 100 of FIG. 1. In an example embodiment, the system 100 may be embodied in a computing device.

Operations of the flowchart, and combinations of operations in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 300 are described with help of system 100. However, the operations of the method 300 can be described and/or practiced by using any other system.

Initially at step 702 of the method 700, the request is received by the user for creation or amendment of the contract. The request comprises a plurality of metadata corresponding to the contract. The plurality of metadata comprises name of contracting parties, a start date of the contract, an end date of the contract, a value and scope of the contract.

Further at step 704 of the method 700, the received request is routed to the authoring unit 114 for choosing a template to be used for the contract. The template is picked from the contract guide 122 based on the set of required combinations using a classification technique. While, if no template exists in the contract guide for the set of required combinations, then the template is generated using a natural language processing technique. At step 706, the chosen template is digitized to identify the plurality of meta-clauses of the contract using the natural language processing technique.

Further at step 708 of the method 700, the plurality of attributes of each of the plurality of meta-clauses are classified. At step 710, the risks associated with the plurality of meta-clauses in the contract are evaluated. The evaluated risks are important to identify the risky clauses in the draft contract. At step 712, the chosen template with the plurality of metadata to generate a draft contract using a deep writing technique.

Further at step 714 of the method 700, the draft contract along with the evaluated risk is sent for the legal review, wherein the legal review results in one of the following: approval of the draft contract, wherein the approval also comprises a set of risky clauses identified in the draft contract, or updating one or more clauses of the draft contract either from the contract guide or manually, wherein the updated contract is sent back for digitization and risk evaluation. At step 716, the draft contract is then sent to the user, if the draft contract is approved in the legal review. The user takes one of the following actions: send the draft contract to a plurality of stakeholders, wherein the plurality of stakeholders is decided based on the set of risky clauses present in the draft contract, and amend the draft contract based on the set of risky clauses identified during the legal review.

Further at step 718 of the method 700, signatures of contracting parties are executed on the draft contract to finalize the contract. And finally, at step 720, the fulfilment of contractual commitments with the contracting parties are tracked, whether obligations have been fulfilled using a fuzzy logic.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address problems high effort and time involved in the creation and maintenance of contracts. The embodiment thus provides an automated method and system for management of lifecycle of contracts.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for management of lifecycle of contracts, the method comprising:
   receiving, via one or more hardware processors, a request by a user for one or more of a creation or an amendment of a contract, wherein the request comprises a plurality of metadata corresponding to the contract;
   routing, via the one or more hardware processors, the received request to an authoring unit for choosing a template to be used for the contract, wherein
   the template is picked from a contract guide based on a set of required combinations using a classification technique, wherein the contract guide uses a deep learning technique to create a plurality of templates for a plurality of scenarios, or
   the template is generated using a natural language processing technique, if no template exists in the contract guide for the set of required combinations;
   digitizing, via the one or more hardware processors, the chosen template to identify a plurality of meta-clauses of the contract using a natural language processing technique;
   classifying, via the one or more hardware processors, a plurality of attributes of each of the plurality of meta-clauses;
   evaluating, via the one or more hardware processors, risks associated with the plurality of meta-clauses in the contract, wherein the risks are evaluated dynamically at a clause level and probability of risk materializing;
   updating, via the one or more hardware processors, the chosen template with the plurality of metadata to generate a draft contract using a deep writing technique;
   sending, via the one or more hardware processors, the draft contract along with the evaluated risk for a legal review to a legal review unit, wherein the legal review unit is configured to perform one of the following:
   approval of the draft contract, wherein the approval also comprises a set of risky clauses identified in the draft contract, or
   if the draft contract is not approved, checking for alternate clauses in the contract guide and updating one or more clauses of the draft contract either from the contract guide or manually, wherein the updated contract is sent back to the authoring unit for digitization and risk evaluation;
   sending, via the one or more hardware processors, the draft contract to the user, if the draft contract is approved in the legal review, wherein the user takes one of the following actions:
   send the draft contract to a plurality of stakeholders along with the indication of one or more risk levels and one or more exception approvals, wherein the plurality of stakeholders is decided based on the set of risky clauses present in the draft contract, wherein the contract guide uses a rule engine to determine a number of approvals required for exceptions in agreed standards for clauses, and
   amend the draft contract based on the set of risky clauses identified during the legal review by checking for the alternate clauses, via a stakeholders review unit, in the contract guide and updating the one or more clauses of the draft contract from the contract guide, wherein the stakeholders review unit sends the updated draft contract to the authoring unit for digitization and risk evaluation before sending the draft contract back to the user;
   executing, via the one or more hardware processors, signatures of contracting parties on the draft contract to finalize the contract;
   managing, via the one or more hardware processors, workflows based on context of the contract to seek the one or more exception approvals from the plurality of stakeholders during the contract creation and alerting the plurality of stakeholders on delivery governance issues;
   tracking, via the one or more hardware processors, the fulfilment of contractual commitments with the contracting parties, whether obligations have been fulfilled using a fuzzy logic; and
   performing, via the one or more hardware processors, analytics and report the final contract on an Input/Output interface based on a request from the plurality of stakeholders as per the stakeholders role.

2. The method of claim 1 further comprises calculating a probability of risks and benefits materializing for each of the plurality of meta-clauses based on historic data from the contract guide.

3. The method of claim 1 further comprises renewing the contract, wherein the renewing comprises:
   checking an end date, a project type of the contract;
   determining an appropriate timeframe to initiate renewal for each customer using a rule engine;
   initiating workflows to the user for approval based on decision made by the rule engine; and
   initiating workflow to the authoring unit for amendment of the contract if the user approves the request.

4. The method of claim 1 further comprising amending the contract, wherein the amending comprises:
   analyzing data related to the contract using NLP to determine if the contract amendment process needs to be triggered;
   initiating a request to the user based on the analysis; and
   initiating the workflow to the authoring unit for creation of amendment, if the user approves the request.

5. The method of claim 1 further comprising terminating the contract, wherein the terminating comprises:
   analyzing data related to the contract using the natural language processing technique to determine if termination process needs to be triggered as per a set of termination clauses present in the contract;
   initiating a workflow to get approval from the user based on the analysis;
   initiating workflow to the authoring module, if the user approves the termination; and
   initiating workflows to the relevant stakeholders to raise invoices related to the termination.

6. The method of claim 1, wherein the plurality of metadata comprises name of contracting parties, a start date of the contract, an end date of the contract, a value and scope of the contract.

7. A system for management of lifecycle of contracts, the system comprises:
   an input/output interface for receiving a request by a user for one or more of a creation or an amendment of a contract, wherein the request comprises a plurality of metadata corresponding to the contract;
   one or more hardware processors;
   a memory in communication with the one or more hardware processors, wherein the one or more first hardware processors are configured to execute programmed instructions stored in the one or more first memories, to;
     route the received request to an authoring unit for choosing a template to be used for the contract, wherein
     the template is picked from a contract guide based on a set of required combinations using a classification technique, wherein the contract guide uses a deep learning technique to create a plurality of templates for a plurality of scenarios, or
     the template is generated using a natural language processing technique, if no template exists in the contract guide for the set of required combinations;
     digitize the chosen template to identify a plurality of meta-clauses of the contract using a natural language processing technique;
     classify a plurality of attributes of each of the plurality of meta-clauses;
     evaluate risks associated with the plurality of meta-clauses in the contract, wherein the risks are evaluated dynamically at a clause level and probability of risk materializing;
     update the chosen template with the plurality of metadata to generate a draft contract using a deep writing technique;
     send the draft contract along with the evaluated risk for a legal review to a legal review unit, wherein the legal review unit is configured to perform one of the following:
       approval of the draft contract, wherein the approval also comprises a set of risky clauses identified in the draft contract, or
       if the draft contract is not approved, checking for alternate clauses in the contract guide and updating one or more clauses of the draft contract either from the contract guide or manually, wherein the updated contract is sent back to the authoring unit for digitization and risk evaluation;
     send the draft contract to the user, if the draft contract is approved in the legal review, wherein the user takes one of the following actions: send the draft contract to a plurality of stakeholders along with the indication of one or more risk levels and one or more exception approvals, wherein the plurality of stakeholders is decided based on the set of risky clauses present in the draft contract, wherein the contract guide uses a rule engine to determine a number of approvals required for exceptions in agreed standards for clauses, and
     amend the draft contract based on the set of risky clauses identified during the legal review by checking for the alternate clauses, via a stakeholders review unit, in the contract guide and updating the one or more clauses of the draft contract from the contract guide, wherein the stakeholders review unit sends the updated draft contract to the authoring unit for digitization and risk evaluation before sending the draft contract back to the user;
     execute signatures of contracting parties on the draft contract to finalize the contract;
     manage workflows based on context of the contract to seek the one or more exception approvals from the plurality of stakeholders during the contract creation and alert the plurality of stakeholders on delivery governance issues;
     track the fulfilment of contractual commitments with the contracting parties, whether obligations have been fulfilled using a fuzzy logic; and
     perform analytics and report the final contract on an Input/Output interface based on a request from the plurality of stakeholders as per the stakeholders role.

8. The system of claim 7 further configured to calculate a probability of risks and benefits materializing for each of the plurality of meta-clauses based on historic data from the contract guide.

9. The system of claim 7 further configured to renew the contract, wherein the renewing comprises:
   checking an end date, a project type of the contract;
   determining an appropriate timeframe to initiate renewal for each customer using a rule engine;
   initiating workflows to the user for approval based on decision made by the rule engine; and
   initiating workflow to the authoring unit for amendment of the contract if the user approves the request.

10. The system of claim 7 further configured to amend the contract, wherein the amending comprises:
analyzing data related to the contract using NLP to determine if the contract amendment process needs to be triggered;
initiating a request to the user based on the analysis; and
initiating the workflow to the authoring unit for creation of amendment, if the user approves the request.

11. The system of claim 7 further configured to terminate the contract, wherein the terminating comprises:
analyzing data related to the contract using the natural language processing technique to determine if termination process needs to be triggered as per a set of termination clauses present in the contract;
initiating a workflow to get approval from the user based on the analysis;
initiating workflow to the authoring module, if the user approves the termination; and
initiating workflows to the relevant stakeholders to raise invoices related to the termination.

12. The system of claim 7, wherein the plurality of metadata comprises name of contracting parties, a start date of the contract, an end date of the contract, a value and scope of the contract.

13. One or more non-transitory machine-readable information storage mediums comprising one or more instructions which when executed by one or more hardware processors cause:
receiving, a request by a user for one or more of a creation or an amendment of a contract, wherein the request comprises a plurality of metadata corresponding to the contract;
routing, via the one or more hardware processors, the received request to an authoring unit for choosing a template to be used for the contract, wherein
the template is picked from a contract guide based on a set of required combinations using a classification technique, wherein the contract guide uses a deep learning technique to create a plurality of templates for a plurality of scenarios, or
the template is generated using a natural language processing technique, if no template exists in the contract guide for the set of required combinations;
digitizing, via the one or more hardware processors, the chosen template to identify a plurality of meta-clauses of the contract using a natural language processing technique;
classifying, via the one or more hardware processors, a plurality of attributes of each of the plurality of meta-clauses;
evaluating, via the one or more hardware processors, risks associated with the plurality of meta-clauses in the contract, wherein the risks are evaluated dynamically at a clause level and probability of risk materializing;
updating, via the one or more hardware processors, the chosen template with the plurality of metadata to generate a draft contract using a deep writing technique;
sending, via the one or more hardware processors, the draft contract along with the evaluated risk for a legal review to a legal review unit, wherein the legal review unit is configured to perform one of the following:
approval of the draft contract, wherein the approval also comprises a set of risky clauses identified in the draft contract, or
if the draft contract is not approved, checking for alternate clauses in the contract guide and updating one or more clauses of the draft contract either from the contract guide or manually, wherein the updated contract is sent back to the authoring unit for digitization and risk evaluation;
sending, via the one or more hardware processors, the draft contract to the user, if the draft contract is approved in the legal review, wherein the user takes one of the following actions:
send the draft contract to a plurality of stakeholders along with the indication of one or more risk levels and one or more exception approvals, wherein the plurality of stakeholders is decided based on the set of risky clauses present in the draft contract, wherein the contract guide uses a rule engine to determine a number of approvals required for exceptions in agreed standards for clauses, and
amend the draft contract based on the set of risky clauses identified during the legal review by checking for the alternate clauses, via a stakeholders review unit, in the contract guide and updating the one or more clauses of the draft contract from the contract guide, wherein the stakeholders review unit sends the updated draft contract to the authoring unit for digitization and risk evaluation before sending the draft contract back to the user;
executing, via the one or more hardware processors, signatures of contracting parties on the draft contract to finalize the contract;
managing, via the one or more hardware processors, workflows based on context of the contract to seek the one or more exception approvals from the plurality of stakeholders during the contract creation and alerting the plurality of stakeholders on delivery governance issues;
tracking, via the one or more hardware processors, the fulfilment of contractual commitments with the contracting parties, whether obligations have been fulfilled using a fuzzy logic; and
performing, via the one or more hardware processors, analytics and report the final contract on an Input/Output interface based on a request from the plurality of stakeholders as per the stakeholders role.

* * * * *